US012761249B2

(12) United States Patent
Zhou et al.

(10) Patent No.: US 12,761,249 B2

(45) Date of Patent: Oct. 13, 2026

(54) CURRENT MONITORING DEVICE AND CURRENT MONITORING METHOD BASED ON CURRENT MONITORING DEVICE

(71) Applicant: Zhongshan Power Supply Bureau of Guangdong Power Grid Co Ltd., Zhongshan (CN)

(72) Inventors: Xiangfeng Zhou, Zhongshan (CN); Chunyuan Cai, Zhongshan (CN); Yongjian Li, Zhongshan (CN); Lifei Li, Zhongshan (CN); Weixia Jian, Zhongshan (CN); Yanhe Yin, Zhongshan (CN); Lei Liu, Zhongshan (CN); Zhenjiang Chen, Zhongshan (CN); Hua Li, Zhongshan (CN); Huibin Zhou, Zhongshan (CN); Shaoyan Jiang, Zhongshan (CN)

(73) Assignee: Zhongshan Power Supply Bureau of Guangdong Power Grid Co Ltd., Zhongshan (CN)

( * ) Notice: Subject to any disclaimer, the term of this patent is extended or adjusted under 35 U.S.C. 154(b) by 171 days.

(21) Appl. No.: 18/778,810

(22) Filed: Jul. 19, 2024

(65) Prior Publication Data

US 2025/0334613 A1 Oct. 30, 2025

(30) Foreign Application Priority Data

Apr. 26, 2024 (CN) ......................... 202410511517.0

(51) Int. Cl.

*G01R 15/20* (2006.01)
*G01R 19/25* (2006.01)
(Continued)

(52) U.S. Cl.

CPC ........... *G01R 15/205* (2013.01); *G01R 19/25* (2013.01); *G06F 7/588* (2013.01); *H04L 9/32* (2013.01)

(58) Field of Classification Search

CPC ......................... G01R 15/205; G01R 19/0092; G01R 15/207; G01R 19/25; H04L 9/32; G06F 7/588
(Continued)

(56) References Cited

U.S. PATENT DOCUMENTS 9,322,887 B1 * 4/2016 Eagen ................ G01R 33/0082
9,739,808 B2 * 8/2017 Fang ...................... G01R 33/02
(Continued)

FOREIGN PATENT DOCUMENTS

CN 102288927 A 12/2011
CN 108416206 A 8/2018
(Continued)

OTHER PUBLICATIONS

Li, Meihong, Smart Grid Wireless Communication Data Encryption Transmission Scheme Based on Dynamic Key, Netinfo Security, No. 12, Dec. 10, 2019, p. 10-21.
(Continued)

*Primary Examiner* — Roberto Velez

(74) *Attorney, Agent, or Firm* — The Sun IP Law

(57) ABSTRACT

The present application provides a current monitoring device and a current monitoring method based on the current monitoring device. The current monitoring device includes: a magnetic ring, formed by a magnetic medium and having an air gap, the magnetic ring being used for being sleeved on a wire to be measured; a current sensor located in an air gap, a sensitive axis of the current sensor is parallel to tangent direction corresponding to center point projected by the current sensor on the magnetic ring, the current sensor including a magnetic sensing circuit having a magneto-resistive sensor, and the magnetic sensing circuit being used for outputting a first voltage signal which varies with a resistance value of the magneto-resistive sensor; a post-processing circuit is electrically connected to a current sensor. The post-processing circuit is used for analyzing a current of a wire to be measured according to a first voltage signal.

17 Claims, 7 Drawing Sheets

(51) Int. Cl.
*G06F 7/58* (2006.01)
*H04L 9/32* (2006.01)

(58) Field of Classification Search
USPC .......................................................... 324/126
See application file for complete search history.

(56) References Cited

U.S. PATENT DOCUMENTS

| | | | | |
|---|---|---|---|---|
| 2014/0253100 | A1* | 9/2014 | Lepine | G01R 19/00 324/126 |
| 2017/0242059 | A1* | 8/2017 | Parker | G01R 21/006 |
| 2019/0146009 | A1* | 5/2019 | Blanchard, III | G01R 15/205 324/117 R |

FOREIGN PATENT DOCUMENTS

| | | | |
|---|---|---|---|
| CN | 110345938 | A | 10/2019 |
| CN | 115524533 | A | 12/2022 |
| CN | 116106798 | A | 5/2023 |
| CN | 116699223 | A | 9/2023 |
| CN | 117640150 | A | 3/2024 |
| DE | 102021111412 | A | 11/2022 |

OTHER PUBLICATIONS

The First Search Report for CN202410511517.0 issued on May 28, 2024.
The Second Search Report for CN202410511517.0 issued on Jun. 25, 2024.

* cited by examiner (a) (b)

CURRENT MONITORING DEVICE AND CURRENT MONITORING METHOD BASED ON CURRENT MONITORING DEVICE

CROSS-REFERENCE TO RELATED APPLICATION

The disclosure claims the benefit of priority to Chinese Patent Application No. 202410511517.0, filed with the Chinese Patent Office on Apr. 26, 2024 and entitled "Current monitoring device and current monitoring method based on current monitoring device", which is incorporated in its entirety herein by reference.

TECHNICAL FIELD

The present invention relates to the field of power detection technologies, and in particular, to a current monitoring device and a current monitoring method based on the current monitoring device.

BACKGROUND

A miniature intelligent current sensing module is a core sensing element of a global Internet of Things, is an important foundation for digital transformation and construction of a digital power grid by a power grid company, is an important foundation for digital power grid, and is an important band for implementing full connection of a power grid device, full sensing of a power grid state, and service application convergence innovation. The whole-domain Internet of Things architecture system is composed of Internet of Things platform components of a sensing layer, a network layer and a platform layer, positioning in a digital transmission technology framework is a basic platform for data acquisition and transmission, in which a sensing layer mainly realizes acquisition, processing, control and interaction of various pieces of information, such as electric power production, transportation, consumption and management, various sensors, intelligent terminal devices and communication modules are used to achieve information collection, identification and processing, and terminal status and data are transmitted to a network layer through a unified Internet of Things standard protocol, the storage and exchange of perceptual information should follow the technical requirements of the relevant specifications.

SUMMARY

The present application mainly aims to provide a current monitoring device and a current monitoring method based on the current monitoring device.

In order to achieve the described object, according to one aspect of the present application, provided is a current monitoring device, including: a magnetic ring which is composed of a magnetic medium and has an air gap, wherein the magnetic ring is used for sleeving on a wire to be measured; a current sensor located in the air gap, a sensitive axis of the current sensor is tangent to the magnetic ring, the current sensor including a magnetic induction circuit having a magnetoresistance sensor, the magnetic induction circuit being used for outputting a first voltage signal which changes with a resistance value of the magnetoresistance sensor; a post-processing circuit, which is electrically connected to the current sensor, wherein the post-processing circuit is used for analyzing and obtaining the current of the wire to be measured according to the first voltage signal.

Alternatively, the magnetoresistance sensor includes a first magnetoresistance sensor and a second magnetoresistance sensor of the same model. The magnetic sensing circuit further includes a first voltage divider resistor and a second voltage divider resistor of the same resistance value. One end of the first voltage divider resistor is electrically connected to the positive end of the power supply. Another end of the first voltage divider resistor is electrically connected to one end of the first magnetoresistance sensor. Another end of the first magnetoresistance sensor is electrically connected to the negative end of the power supply. One end of the second magnetoresistance sensor is electrically connected to the positive end of the power supply. Another end of the second magnetoresistance sensor is electrically connected to one end of the second voltage divider resistor. Another end of the second voltage divider resistor is electrically connected to the negative end of the power supply. Two output terminals of the magnetic sensing circuit are electrically connected to a first common terminal and a second common terminal, respectively, so as to output the first voltage signal. The first common terminal is a common terminal of the first voltage divider resistor and the first magnetoresistance sensor, and the second common terminal is a common terminal of the second.

Optionally, the current monitoring device further includes: a voltage sensor, including two probes and a signal processing module, wherein the two probes are respectively arranged in contact with a wire to be measured and a null wire, the signal processing module is respectively electrically connected to the two probes to form a measurement loop, and the post-processing circuit is used for inputting a reference signal into the signal processing module and obtaining a voltage of the wire to be measured through analysis according to a second voltage signal detected by the signal processing module.

Optionally, the signal processing module includes a voltage-dividing capacitor, a voltage detection device and a reference signal, wherein the voltage detection device is used for detecting the second voltage signal of the voltage-dividing capacitor, the reference signal is input into one end of the voltage-dividing capacitor, and a voltage signal of a coupling capacitance between the wire to be measured and the probe is input into another end of the voltage-dividing capacitor.

Optionally, the post processing circuit further includes a security encryption module, wherein the security encryption module is used for using an SM4 algorithm to generate an authentication ciphertext so as to perform one-way identity authentication on a terminal device acquiring data of the current monitoring device; and the security encryption module is further used for using a symmetric encryption algorithm to encrypt sent data and then sending same to the terminal device which passes the identity authentication, wherein the sent data includes a current and a voltage of the wire to be measured.

Optionally, the current monitoring device includes a first fixing piece and a second fixing piece, wherein the first fixing piece is used for fixing the magnetic ring on the wire to be measured so that the wire to be measured is located on the axis of the magnetic ring, and the second fixing piece is used for fixing the current sensor in the air gap so that the sensitive axis of the current sensor is parallel to the tangent direction corresponding to the center point projected by the current sensor on the magnetic ring.

According to another aspect of the present application, there is provided a current monitoring method for a current monitoring device, including: when a magnetic ring is sleeved on a wire to be measured, energizing a current sensor; acquiring a first voltage signal output by the current sensor; calculating a resistance value of a magneto-resistive sensor according to a voltage of the first voltage signal; querying a corresponding magnetic field strength according to the resistance value of the magnetoresistance sensor, so as to obtain a magnetic field strength generated at the current sensor by the wire to be measured; calculating and obtaining a current of the wire to be measured according to the magnetic field intensity and the position parameter, wherein the position parameter is a parameter characterizing a relative position between the current sensor and the wire to be measured.

Optionally, the current monitoring device further includes a voltage sensor, wherein the voltage sensor includes two probes and a signal processing module, the two probes are respectively arranged to be in contact with the wire to be measured and the zero line, the signal processing module is respectively electrically connected to the two probes to form a measurement loop, the post-processing circuit is used for inputting a reference signal into the signal processing module, and analyzing and obtaining a voltage of the wire to be measured according to a second voltage signal detected by the signal processing module, the signal processing module includes a voltage-dividing capacitor, a voltage detection apparatus and a reference signal, the voltage detection apparatus is used for detecting the second voltage signal of the voltage-dividing capacitor, the reference signal is input into one end of the voltage-dividing capacitor, and a voltage signal of a coupling capacitance between the wire to be measured and the two probes is input into another end of the voltage-dividing capacitor, and the method further includes: acquiring two second voltage signals detected at two ends of the voltage-dividing capacitor; calculating a ratio of the second voltage signal generated by the coupling capacitance input to the second voltage signal generated by the reference signal input, so as to obtain a voltage ratio, wherein the voltage ratio is a ratio of a voltage of the wire to be measured to a voltage of the reference signal; and calculating to obtain the voltage of the wire to be measured according to the voltage of the reference signal and the voltage ratio.

Optionally, the method further includes: generating a random number; encrypting the random number by using a preset authentication key to obtain an authentication ciphertext; sending the authentication ciphertext and a security chip ID to a terminal device, and receiving a decryption result of the terminal device, wherein the security chip ID is an ID of the current monitoring device; and in a case that the decryption result is consistent with the random number, the terminal device passes the authentication.

Optionally, after the authentication of the terminal device is passed, the method further includes: encrypting sent data by using the random number, so as to obtain an encrypted ciphertext, wherein the sent data includes a current and a voltage of the wire to be measured; sending the serial number and MAC of the current monitoring device and the encrypted ciphertext to the terminal device, so that the terminal device decrypts and obtains the sent data.

The figures include the following reference signs:

01, wire to be measured; 02, zero line; 10, magnetic ring; 11, air gap; 20, current sensor; 21, sensitivity axis; 30, a post-processing circuit; 40, probe; 50, signal processing module.

DETAILED DESCRIPTION OF THE EMBODIMENTS

It is important to note that the embodiments of the present disclosure and the characteristics in the embodiments can be combined under the condition of no conflicts. The present disclosure will be described below with reference to the drawings and embodiments in detail.

To make persons skilled in the art better understand the solutions of the present application, the following clearly and completely describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall belong to the scope of protection of the present application.

It should be noted that the terms "first" and "second" in the specification, claims, and accompanying drawings of the present application are used to distinguish similar objects, and are not necessarily used to describe a specific sequence or order. It should be understood that the data so used may be interchanged where appropriate for the embodiments of the present application described herein. In addition, the terms "include" and "have", and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

As introduced in the background art, in the prior art, a detection error of a circuit is large due to a magnetic induction position deviation of a current sensor. In order to solve the technical problem, embodiments of the present application provide a current monitoring device and a current monitoring method based on the current monitoring device.

Figure 1:
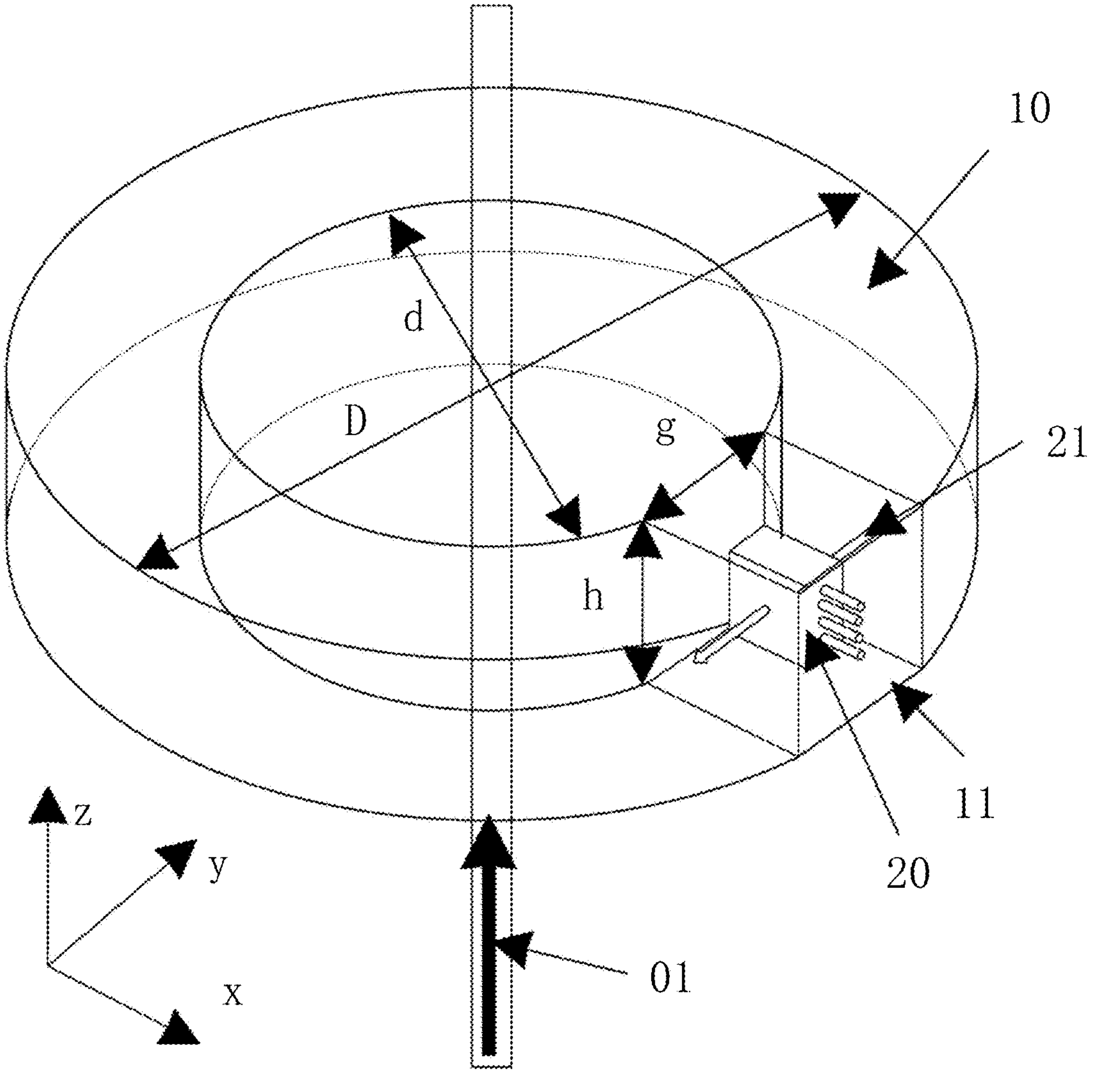
FIG. 1 shows a schematic diagram of a current monitoring device provided in an embodiment of the present application.
Figure 2:
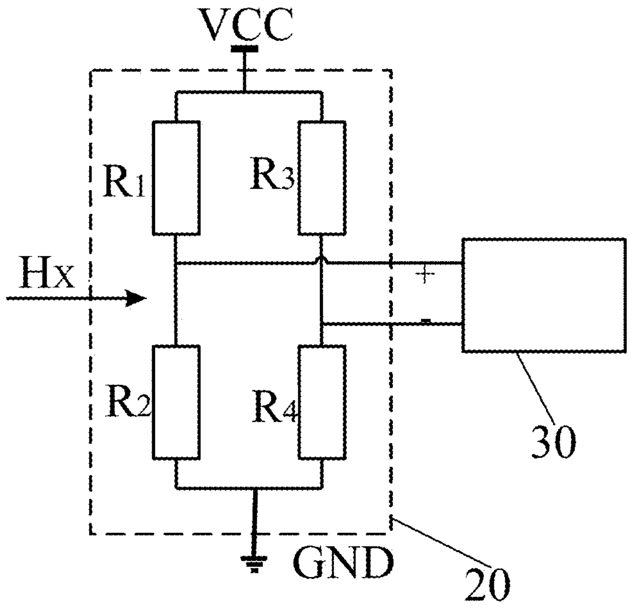
FIG. 2 shows a schematic diagram of an equivalent model of a tunneling magnetoresistance bridge according to an embodiment of the present application.

The present embodiment provides a current monitoring device, as shown in FIGS. 1 and 2, including:

A magnetic ring 10, which is composed of a magnetic medium and has an air gap 11, wherein the described magnetic ring 10 is used for sleeving on a wire to be measured 01;

A current sensor 20 located in the air gap, a sensitive axis 21 of the current sensor 20 is parallel to the tangent direction corresponding to the center point projected by the current sensor on the magnetic ring 10, the current sensor 20 including a magnetic sensing circuit having a magneto-resistive sensor, and the magnetic sensing circuit being used for outputting a first voltage signal which varies with a resistance value of the magneto-resistive sensor;

A post-processing circuit 30, which is electrically connected to the current sensor 20, wherein the post-processing circuit 30 is used for analyzing and obtaining the current of the wire to be measured 01 according to the first voltage signal.

The current sensor of the current monitoring device senses a magnetic field generated by a current of a wire to be measured and causes a change in a resistance value of a magnetoresistance sensor, that is, according to a change in a first voltage signal output by the current sensor, an induced magnetic field strength can be analyzed, so as to analysis the current of the wire to be measured, and the magnetic induction strength is greatly improved via a magnetic ring, thereby reducing the proportion of a detection error caused by the deviation of a current sensor from a standard magnetic induction position of the wire to be measured, and solving the problem in the prior art that a detection error of a circuit is large due to the deviation of a magnetic induction position of the current sensor.

In order to improve the detection accuracy, in an optional embodiment, as shown in FIG. 2, the described magneto-resistive sensor includes a first magneto-resistive sensor $R_2$ and a second magneto-resistive sensor $R_3$ which are of the same model number; the described magnetic induction circuit further includes a first voltage divider resistor $R_1$ and a second voltage divider resistor $R_4$ which are of the same resistance value; one end of the described first voltage divider resistor $R_1$ is electrically connected to a positive power supply VCC; another end of the described first voltage divider resistor $R_1$ is electrically connected to one end of the described first magneto-resistive sensor $R_2$; another end of the described first magneto-resistive sensor $R_2$ is electrically connected to a negative power supply GND; one end of the described second magneto-resistive sensor $R_3$ is electrically connected to the positive power supply VCC; another end of the described second magneto-resistive sensor $R_3$ is electrically connected to one end of the described second voltage divider resistor $R_4$; another end of the described second voltage divider resistor $R_4$ is electrically connected to the negative power supply; two output ends of the described magnetic induction circuit are respectively electrically connected to a first common end and a second common end so as to output the described first voltage signal; the described first common end is a common end of the described first voltage.

In the foregoing implementation, a resistance change of the first magnetoresistance sensor $R_2$ affects a voltage of the first common terminal, a resistance change of the second magnetoresistance sensor $R_3$ affects a voltage of the second common terminal, and a change direction of the voltage of the first common terminal is opposite to that of the voltage of the second common terminal. In this way, an influence of a magnetic field on a first voltage signal is amplified, an error of analyzing a current of a wire to be measured by using the first voltage signal is reduced, and detection precision is improved. In addition, the magneto-resistance sensor is essentially a resistor that varies with an externally applied magnetic field. A complex peripheral circuit is not required to measure a magnetic field by using a magneto-resistor, the magneto-resistance bridge can be packaged in a chip with a small size, the magnetic field is not required to be measured, and a zero input resistor of the magneto-resistor is flexible and adjustable; therefore, it is relatively easy to implement low power consumption and miniaturization by designing a current sensor by using a magneto-resistor.

Figure 3:
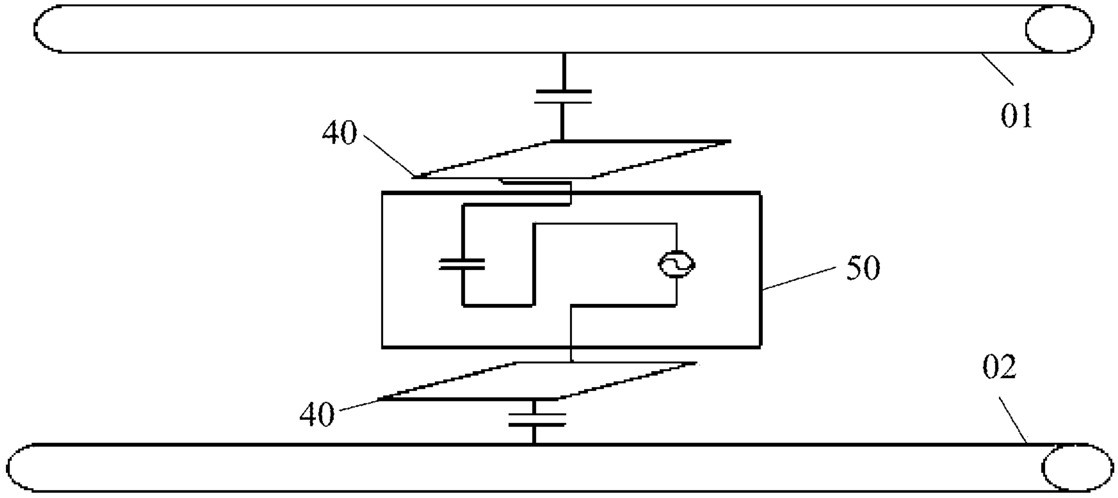
FIG. 3 shows a schematic diagram of a voltage sensor provided in an embodiment of the present application.

In order to detect a voltage of a conducting wire without intrusion, in an optional embodiment, as shown in FIG. 3, the current monitoring device further includes:

a voltage sensor, including two probes 40 and a signal processing module 50, wherein the two probes 40 are respectively arranged in contact with the to-be-measured wire 01 and the null wire 02; the signal processing module 50 is respectively electrically connected to the two probes 40 to form a measurement loop; and the post-processing circuit is used for inputting a reference signal to the signal processing module 50, and analyzing and obtaining a voltage of the to-be-measured wire 01 according to a second voltage signal detected by the signal processing module 50.

In the foregoing implementation, two probes are disposed in contact with the to-be-measured conductor and the null wire, respectively, to form two coupling capacitances, so that a measurement voltage (a voltage of the to-be-measured conductor) is input into a signal processing module through the coupling capacitances, and a reference signal is also input into the signal processing module, that is, the signal processing module compares two voltage signals to analyze the measurement voltage (the voltage of the to-be-measured conductor), so as to implement non-intrusive detection of a conductor voltage.

Figure 4:
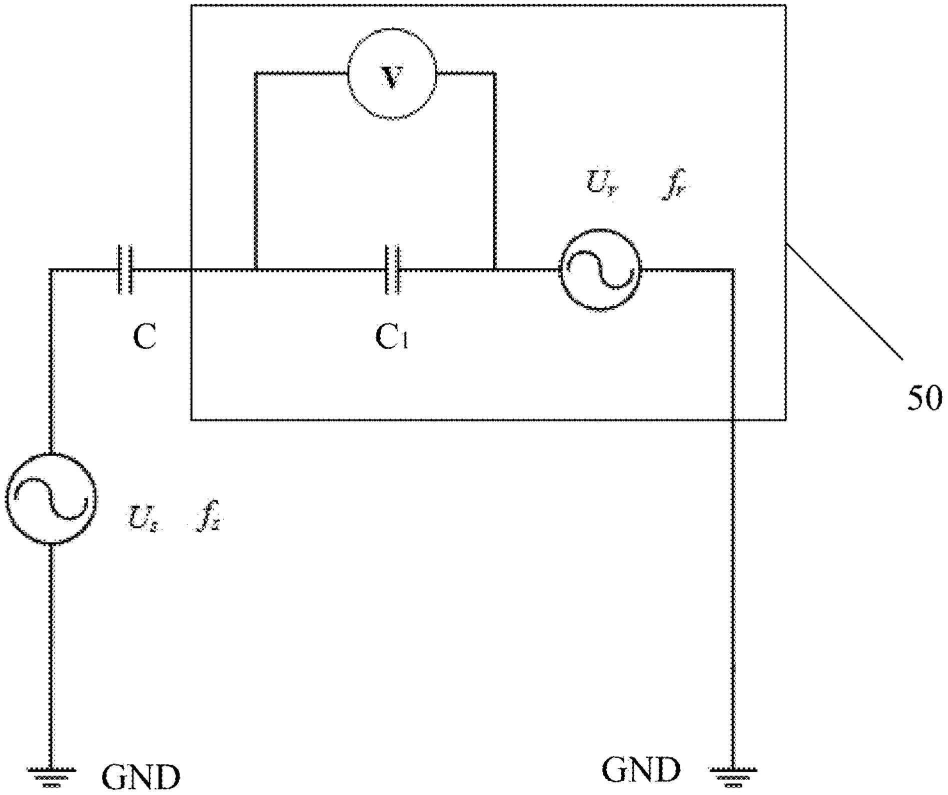
FIG. 4 illustrates a non-intrusive voltage measurement equivalent circuit diagram according to an embodiment of the present application.

In order to facilitate calculation and measurement of a voltage, in an optional embodiment, as shown in FIG. 4, the signal processing module includes a voltage-dividing capacitor $C_1$, a voltage detection apparatus V and a reference signal ($U_r$, $f_r$). The voltage detection apparatus is used for detecting the described second voltage signal of the described voltage-dividing capacitor $C_1$, the described reference signal ($U_r$, $f_r$) is input into one end of the described voltage-dividing capacitor, and the voltage signal of the coupling capacitance C between the described wire to be measured and the described probe is input into another end of the described voltage-dividing capacitor.

In the described embodiment, the voltage sensor and the wire to be measured and the null wire form a loop, an equivalent circuit of the loop is as shown in FIG. 4, and the reference signal Ur is a high-frequency voltage signal with a known amplitude and frequency to be injected by the sensor. According to the circuit superposition theorem, the whole circuit can be decomposed into circuits with different voltage sources (a to-be-tested power frequency voltage source, and a known inter-frequency voltage source). Thus, the expression of the voltage $U_s$ of the wire to be measured can be deduced as follows:

$$U_s = \frac{V_s}{V_r} U_r,$$

in an actual circuit, signals detected on the voltage-dividing capacitor $C_1$ are aliases of two kinds of signals, $V_s$ and $V_r$. It should be noted that $V_s$ and $V_r$ are sinusoidal signals with frequencies of $f_s$ and $f_r$, respectively, and therefore, it can be easily calculated in engineering through a hardware processing method (such as a filter circuit) or a software processing method (Fourier transform).

In order to achieve data security, in an optional embodiment, the post-processing circuit further includes a security encryption module, the security encryption module being used for generating an authentication ciphertext by using an SM4 algorithm so as to perform one-way identity authentication on a terminal device acquiring data of the current monitoring device; and the security encryption module being further used for encrypting sent data by using a symmetric encryption algorithm and then sending same to the terminal device which passes identity authentication, the sent data including a current and a voltage of the wire to be measured.

In the foregoing embodiment, one-way identity authentication is implemented between a sensor and a terminal device based on an SM4 algorithm, and encryption transmission is performed after the authentication succeeds, thereby preventing data leakage and achieving data security.

In order to prevent the current sensor from being displaced, in an optional embodiment, the current monitoring device includes a first fixing piece and a second fixing piece. The first fixing piece is used for fixing the magnetic ring on the wire to be measured, so that the wire to be measured is located on the axis of the magnetic ring. The second fixing piece is used for fixing the current sensor in the air gap, so that the sensitive axis of the current sensor is parallel to the tangent direction corresponding to the center point projected by the current sensor on the magnetic ring.

In the foregoing embodiment, the current sensor is a TMR-based toroidal magnetic core current sensor. As shown in FIG. 1, a loop-shaped open magnetic core is used to wrap around a to-be-tested conductor, a TMR device is placed at an opening of the magnetic core, and a sensitivity direction of the TMR is parallel to a magnetic circuit direction.

Figure 5:
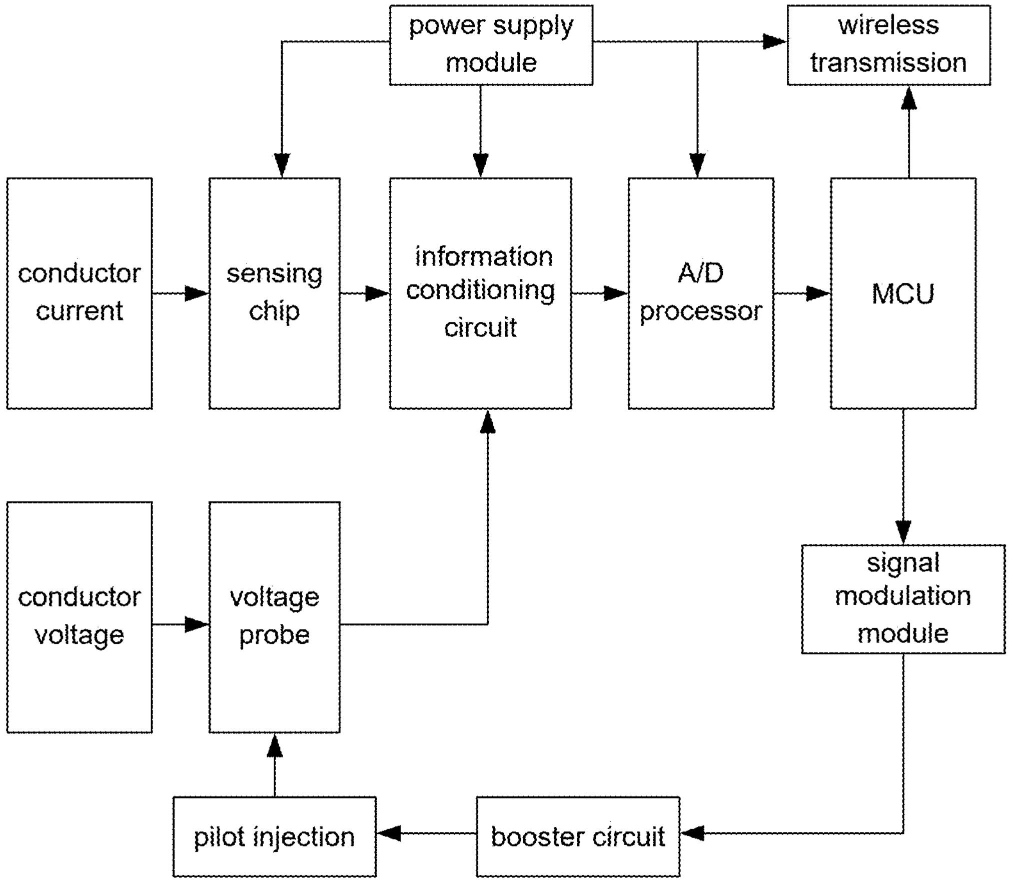
FIG. 5 shows a system architecture of a miniature smart current sensor according to an embodiment of the present application.

As shown in FIG. 5, the micro-intelligent current sensing module is composed of two parts: a sensor and a concentrator (a post-processing circuit), and is suitable for integrating electric quantity of a low-voltage power distribution circuit such as 400 V. The sensor is a snap-type charging installation mode, uses an integrated structure of a temperature sensor, current sampling, voltage sampling, pilot frequency signal injection, wireless transmission and installation components, collects a main loop current, a voltage and a temperature of a monitoring point, directly converts same into a digital quantity, communicates with a concentrator through a 2.4 GHz wireless communication protocol, and has edge calculation capabilities such as fault recording and harmonic measurement; an installation mode of a concentrator is a wall-mounted type or a guide rail type; an AC 220V power supply is used to supply power; an RS485 communication interface is provided; a Modbus RTU communication protocol is supported to communicate with an edge device, an upper computer or other intelligent devices, so as to realize the forwarding of collected data; and a user can view a primary current value, a voltage, a harmonic, a recording wave waveform and a temperature value through a corresponding device. A miniature intelligent current sensor has sensing and edge calculation capabilities, and can process and process collected information, and collect, process, determine and transmit information according to a certain policy, while reaching a certain standard. For massive deployment and application requirements, the sensor has the characteristic of low power consumption, and can work by relying on a power frequency electromagnetic field and a backup energy source of a battery.

In addition, compared with a structure without a magnetic ring, the sensor has a good electromagnetic measurement effect, and the magnetic ring can amplify a magnetic field at an air gap, thereby significantly improving the sensitivity of the whole sensor. In addition, the use of the magnetic ring can almost ignore the error caused by the angular deflection and the distance deflection, thereby greatly facilitating the installation and measurement workload of the sensor in practical use. The collecting magnetic effect and spatial offset on the collecting magnetic effect was analyzed as follows.

The magnetic field strength at the center of the air gap under the non-magnetic ring is:

$$\begin{cases} H_1 = \dfrac{2I}{\pi(D+d)} \\ H_2 = \dfrac{\mu_r I}{\mu_r g + \pi(D+d)/2 - g} \end{cases},$$

In the formula, $H_1$ and $H_2$ are the magnetic fields when there is no magnetic ring and when there is a magnetic ring respectively, and $\mu_r$ is the relative magnetic permeability of the magnetic ring.

Obviously, the magnetic ring can amplify the magnetic field at the air gap, thereby significantly improving the overall sensitivity of the sensor. Magnification is:

$$\frac{H_1}{H_2} = \frac{\pi(D+d)/2}{g + \dfrac{\pi(D+d)/2 - g}{\mu_r}} \approx \frac{\pi(D+d)/2}{g}.$$

The magnetic ring air gap is dependent on the tunneling magneto-resistive chip volume and the current range being measured. The air gap must be larger than the length of the sensitive axis of the chip, while leaving the magnetic field generated by the maximum current to be measured within the linear range of the chip. The amplification factor can be changed very conveniently by adjusting an air gap, so that current sensors in different ranges are designed. The amplification factor calculated by the above formula is about 31.4, and due to the magnetic leakage effect at the edge of the magnetic ring, the simulation calculation amplification factor is about 22.54. (Simulation parameters magnetic ring inner diameter d=18 cm, outer diameter D=22 cm, thickness h=2 cm, air gap length g=2 cm, current I=1 A).

With regard to the effect of a spatial offset on the magnetization, under normal conditions, a wire is located at a central axis of a magnetic ring, a chip is located at the center of an air gap, and a sensitive axis of the chip is parallel to the tangent direction corresponding to the center point projected by the chip on the magnetic ring. As shown in FIG.

Figure 6:
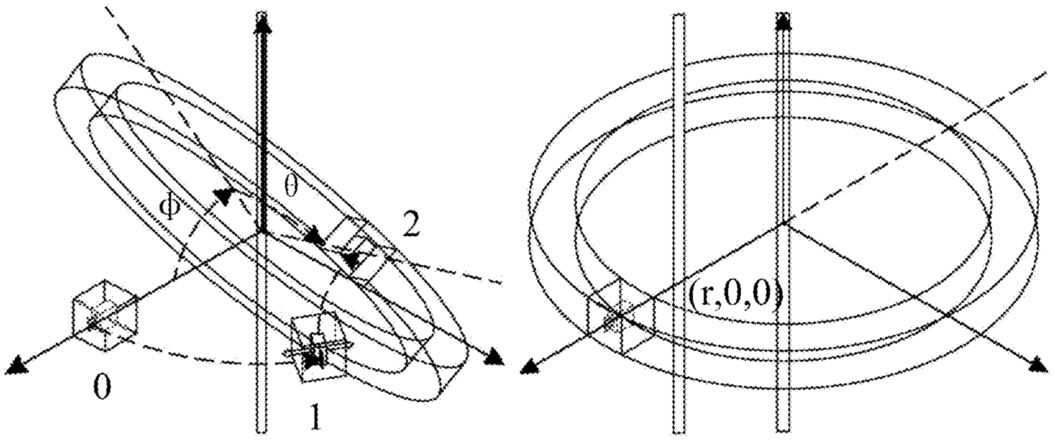
FIG. 6 shows a schematic diagram of an offset of a magnetic ring and a magnetic resistance chip according to an embodiment of the present application, where (a) is a schematic diagram of an angular offset, and (b) is a schematic diagram of a distance offset.

6(*a*), the magnetic ring is firstly shifted by θ(0→1) around the Z axis by the right hand, and then is shifted by φ(1→2) around the Y axis by the left hand, so that the angle between the magnetic ring and the magneto-resistive chip is shifted. As shown in FIG. 6(*b*), the distance between the magnetic ring and the magneto-resistive chip is deviated.

When there is no magnetic ring, after the described angle offset, the central magnetic field of the air gap is:

$$H = \frac{\mu_0 I}{\pi(D+d)/2} \cdot \frac{\cos\varphi}{1-\cos^2\theta\sin^2\varphi}.$$

Figure 7:
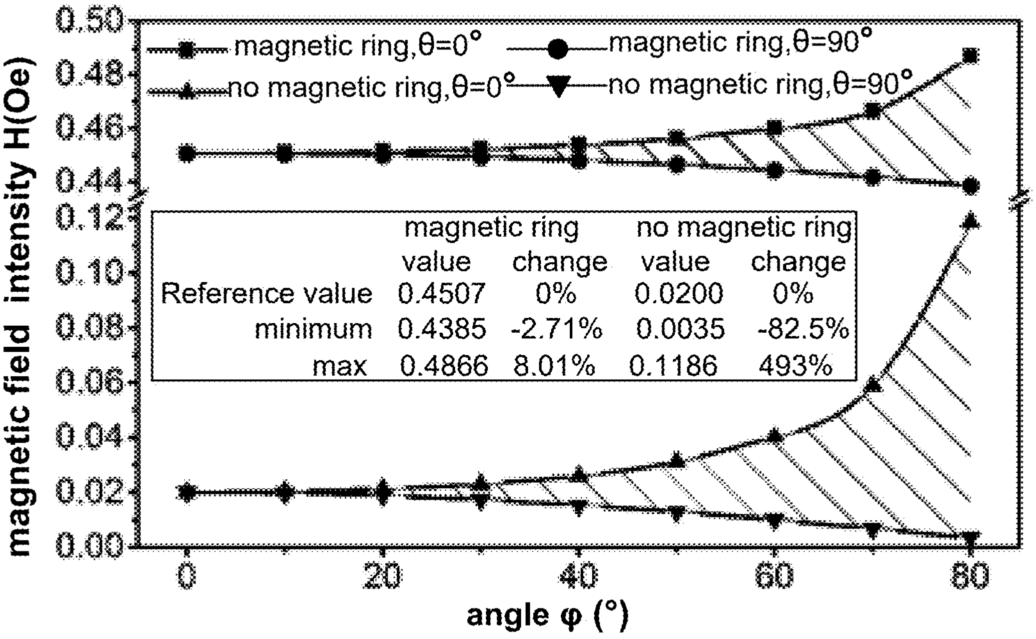
FIG. 7 is a schematic diagram illustrating the change of an air gap magnetic field with and without a magnetic ring with an angle offset according to an embodiment of the present application.

The change in the central magnetic field with and without the air gap under the magnetic ring with angular offset is shown in FIG. 7. With the non-magnetic ring, the magnetic field changes substantially uniformly, taking an extremum at an extreme angle. When θ=90°, φ=80°, an air gap is closest to a wire, and when there is no magnetic ring, the direction of a magnetic field is consistent with the direction of a sensitive axis, and at this moment, a maximum value is obtained; when θ=0° and φ=80°, the air gap is far away from the conducting wire, and the direction of the magnetic field and direction of the sensitive axis when there is no magnetic ring are nearly perpendicular, and at this moment, a minimal value is obtained. Compared with the case of no magnetic ring, the magnetic ring can greatly improve the error caused by the angular deflection, and the error is reduced by more than 30 times. In the case of a magnetic ring, the maximum error caused by extreme angle deflection is −2.61%~+8.01%, while when θ<60°, the maximum error caused by angle deflection is −1.4%~2.1%, while the variation of the magnetic field under the non-magnetic ring is −82.5%~493% percent and −50%~100%, respectively.

Figure 8:
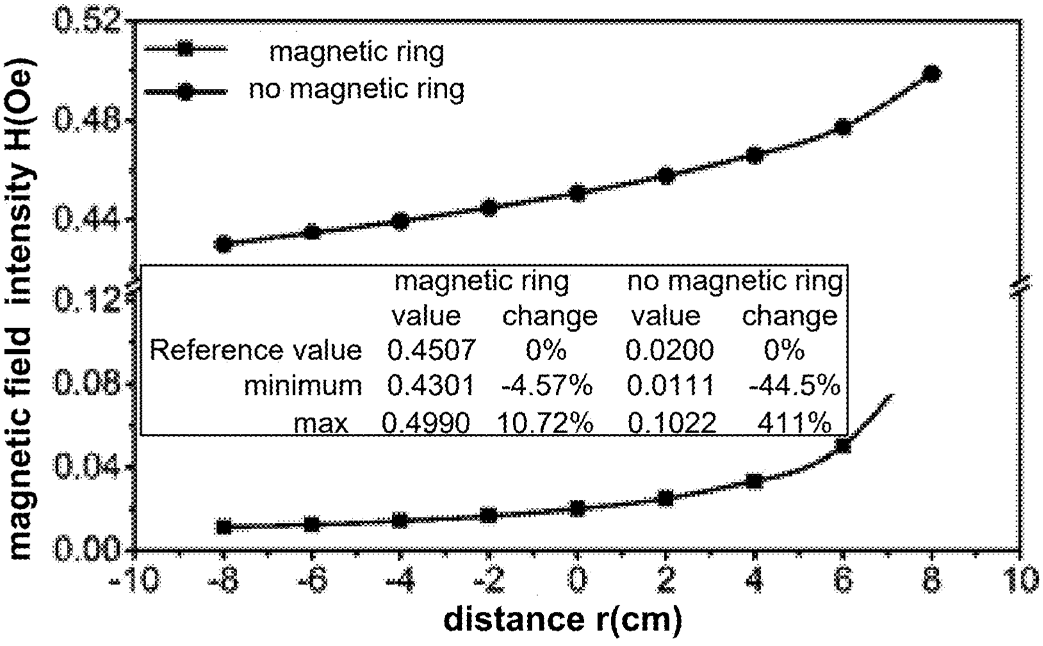
FIG. 8 shows a schematic diagram of a change of an air gap magnetic field with a non-magnetic ring with a distance offset according to an embodiment of the present application.

Simulation calculation of the deviation of the wire from the center of the magnetic ring is shown in FIG. 8, and the distance of the wire deviating from the center of the axis is r. In the presence or absence of the magnetic ring, the magnetic field changes at different offset positions are substantially consistent, and an extremum is obtained at an extreme position. When r=8 cm, the air gap is closest to the wire, and at this moment, a maximum value is obtained; when r=−8 cm, the air gap is far from the wire, at which point a minimal value is obtained. In the case of a magnetic ring, the error caused by the extreme position displacement is at most −4.57%~+10.72%, and when |r|<4 cm, the error caused by the position displacement is at most −2.52%~3.42%, and in the case of no magnetic ring, the values thereof are −44.5%~441% and −28.6%~66.7%, respectively. Compared with the case of no magnetic ring, the magnetic ring can greatly improve the error caused by the position displacement, and the error is reduced by more than 10 times.

The following clearly and completely describes the technical solutions in the embodiments of the present invention with reference to the accompanying drawings in the embodiments of the present invention.

A current monitoring method based on a current monitoring device is provided in the present embodiment. It should be noted that the steps shown in the flowchart of the drawings can be executed in a computer system such as a set of computer executable instructions, and although the logic order is shown in the flowchart, in some cases, the shown or described steps can be executed in an order different from that described here.

Figure 9:
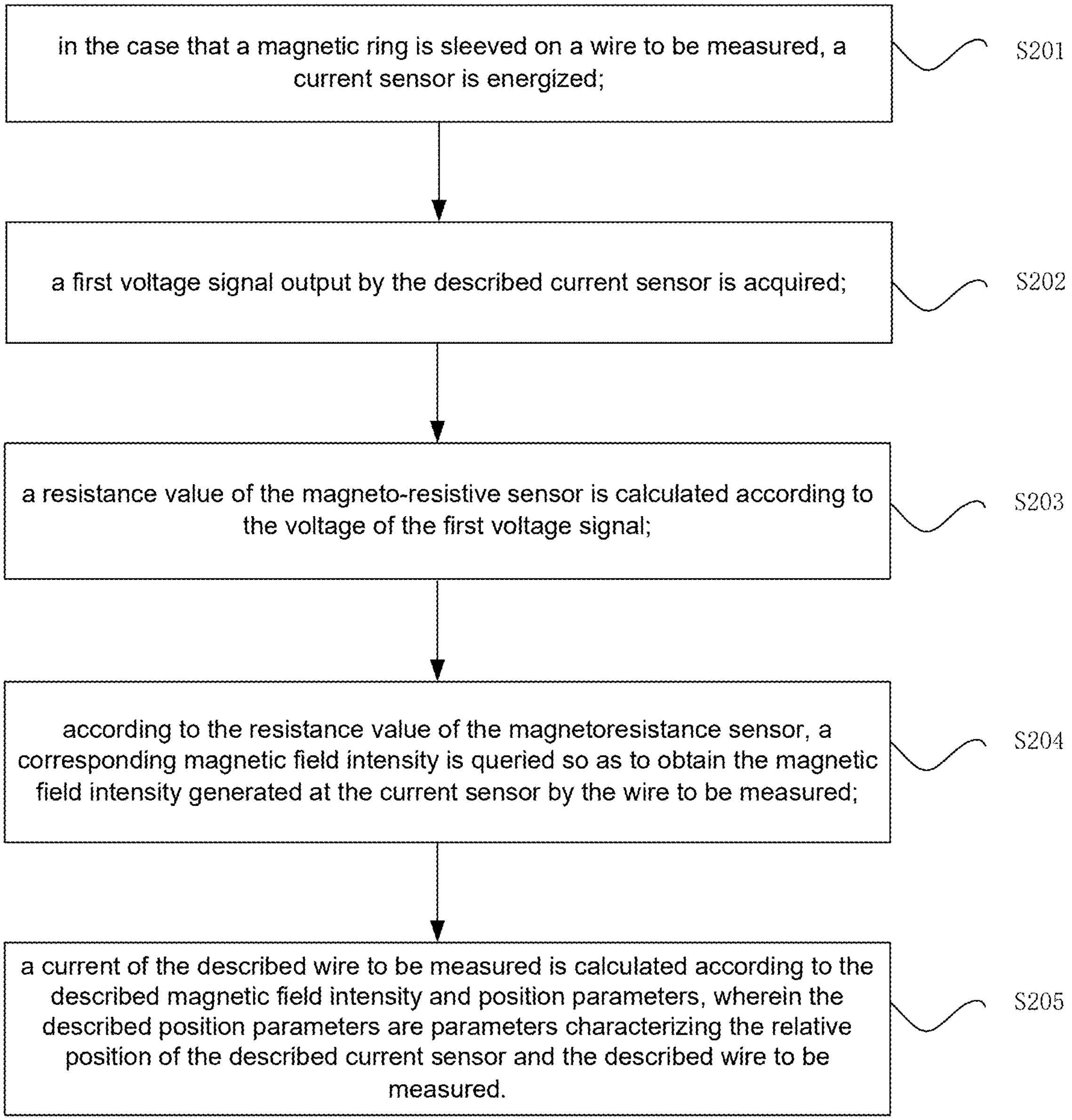
FIG. 9 shows a schematic flowchart of a current monitoring method according to an embodiment of the present application.

FIG. 9 is a flowchart of a current monitoring method according to an embodiment of the present application. As shown in FIG. 9, the method includes the following steps:

step S201, in the case that a magnetic ring is sleeved on a wire to be measured, a current sensor is energized;

step S202, a first voltage signal output by the described current sensor is acquired;

step S203, a resistance value of the magneto-resistive sensor is calculated according to the voltage of the first voltage signal;

step S204, according to the resistance value of the magnetoresistance sensor, a corresponding magnetic field intensity is queried so as to obtain the magnetic field intensity generated at the current sensor by the wire to be measured;

step S205, a current of the described wire to be measured is calculated according to the described magnetic field intensity and position parameters, wherein the described position parameters are parameters characterizing the relative position of the described current sensor and the described wire to be measured.

In the current monitoring method, a current sensor of the current monitoring device senses a magnetic field generated by a current of a wire to be measured, causing a change in a resistance value of a magnetoresistance sensor, so that a sensed magnetic field strength can be analyzed according to a change in a first voltage signal output by the current sensor, thereby analyzing the current of the wire to be measured, and a magnetic induction intensity is greatly improved via a magnetic ring, thereby reducing the proportion of a detection error caused by the deviation of a current sensor from a standard magnetic induction position of the wire to be measured, solving the problem in the prior art that a detection error of a circuit is large due to the deviation of a magnetic induction position of the current sensor, and thus the change in the magnetic field strength can be calculated via a first voltage signal, thereby accurately calculating the current of the wire to be measured.

In order to realize a non-intrusive voltage measurement, in an optional embodiment, the current monitoring device further includes a voltage sensor, the voltage sensor includes two probes and a signal processing module, the two probes are respectively arranged in contact with the wire to be measured and the null wire, the signal processing module is electrically connected to the two probes respectively to form a measurement loop, the post-processing circuit is used for inputting a reference signal into the signal processing module, and obtaining a voltage of the wire to be measured through analyzing a second voltage signal detected by the signal processing module, the signal processing module includes a voltage-dividing capacitor, a voltage detection device and a reference signal, the voltage detection device is used to detect the second voltage signal of the voltage-dividing capacitor, the reference signal is input into one end of the voltage-dividing capacitor, and a voltage signal of a coupling capacitance between the wire to be measured and the two probes is input into another end of the voltage-dividing capacitor. The method further includes:

step S301, acquiring two second voltage signals detected at two ends of the described voltage-dividing capacitor;

step S302, calculating a ratio of the described second voltage signal generated by the described coupling capacitance input to the described second voltage signal generated by the described reference signal input, so as to obtain a voltage ratio, in which the described voltage ratio is a ratio of a voltage of the described wire to be measured to a voltage of the described reference signal;

step S303, according to the voltage of the described reference signal and the described voltage ratio, calculating to obtain the described voltage of the wire to be measured.

In the described embodiment, the voltage sensor is a loop constituted by a wire to be measured and a null wire, and an equivalent circuit of the loop is as shown in FIG. 4, in which the middle reference signal Ur is a radio frequency voltage signal with a known amplitude and frequency to be injected by the sensor. According to the circuit superposition theorem, the whole circuit can be decomposed into circuits with different voltage sources (a to-be-tested power frequency voltage source, and a known inter-frequency voltage source). Thus, the expression of the voltage $U_s$ of the wire to be measured can be deduced as follows:

$$U_s = \frac{V_s}{V_r} U_r,$$

in an actual circuit, signals detected on the voltage-dividing capacitor $C_1$ are aliases of two kinds of signals, $V_s$ and $V_r$. It should be noted that $V_s$ and $V_r$ are sinusoidal signals with frequencies $f_s$ and $f_r$, respectively, and thus can be easily obtained through hardware processing methods (such as a filter circuit) or software processing methods (Fourier transform) in engineering.

In order to achieve data security, in an optional embodiment, the method further includes:

Step S401, generating a random number;

Step S402, encrypting the random number by using a preset authentication key to obtain an authentication ciphertext;

Step S403, sending the described authentication ciphertext and a security chip ID to a terminal device, and receiving a decryption result of the described terminal device, wherein the described security chip ID is an ID of the described current monitoring device;

Step S404, if the decryption result is consistent with the random number, the terminal device passes the authentication.

Figure 10:
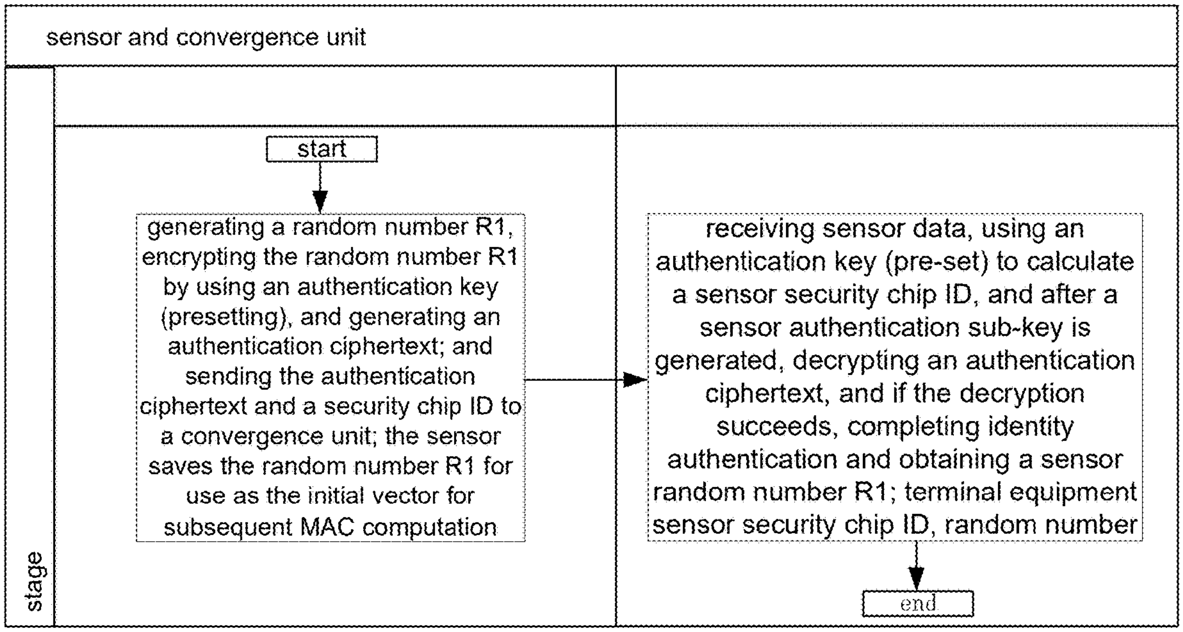
FIG. 10 shows a flowchart of identity authentication between a sensor and a terminal device according to an embodiment of the present application.

In the foregoing embodiment, as shown in FIG. 10, a terminal device needs to consider a problem of simultaneous access of a plurality of sensors, and supports access registration of the sensors and a key management function; a key authentication key and an encryption key inside a sensor are both SM4 symmetric keys, in which the authentication key and the session protection key are all pre-set; the authentication protection keys of each terminal device are the same, and the authentication protection key of the sensor side is "one-core one-to-one-secret"; the terminal authentication protection key is generated by means of the dispersion of the serial number of the sensor chip, and is only used for identity authentication; session protection keys in a terminal device chip are the same, and a session key at a sensor side realizes "one-core one-to-one encryption", and the session protection key of the terminal is generated by means of sequence number dispersion of the sensor chip.

In order to achieve data security, in an optional embodiment, after the authentication of the terminal device is passed, the method further includes:

step S501, encrypting transmission data by using the described random number, so as to obtain an encrypted ciphertext, in which the described transmission data includes a current and a voltage of the described wire to be measured;

step S502, send the serial number and MAC of the current monitoring device and the encrypted ciphertext to the terminal device, so that the terminal device decrypts and obtains the sent data.

Figure 11:
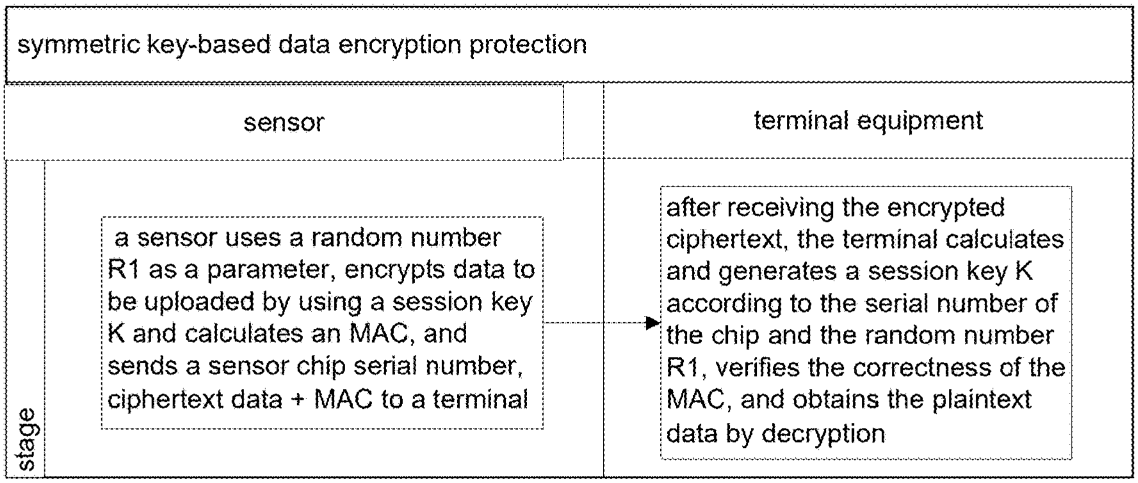
FIG. 11 shows a flowchart of encrypting a sensor and a terminal device according to an embodiment of the present application.

In the described embodiment, as shown in FIG. 11, during data transmission, a session key is used between a sensor and a concentrator to perform encryption and then transmission, and a ciphertext+MAC manner is selected according to a service type to perform protection; a terminal device uses a random number R1 in an authentication process as a transmission parameter; data to be sent is encrypted using an uplink session key K randomly generated during an authentication process; and a message authentication code (MAC) is calculated, and ciphertext data+MAC is sent to an edge device. After receiving the ciphertext data, the edge device generates a session key K according to the serial number of the sensor security chip and the random number R1, verifies the integrity of the data (verifies the correctness of the MAC), and decrypts same to obtain plaintext data.

It should be noted that, the steps shown in the flowchart of the drawings can be executed in a computer system such as a set of computer executable instructions, and although the logic order is shown in the flowchart, in some cases, the shown or described steps can be executed in an order different from that described here.

Embodiments of the present invention provide a computer readable storage medium. The computer readable storage medium includes a stored program. When the program runs, a device in which the computer readable storage medium is located is controlled to execute the current monitoring method.

Specifically, the current monitoring method includes:

step S201, in the case that a magnetic ring is sleeved on a wire to be measured, a current sensor is energized;

step S202, a first voltage signal output by the described current sensor is acquired;

step S203, a resistance value of the magneto-resistive sensor is calculated according to the voltage of the first voltage signal;

step S204, according to the resistance value of the magnetoresistance sensor, a corresponding magnetic field intensity is queried so as to obtain the magnetic field intensity generated at the current sensor by the wire to be measured;

step S205, a current of the described wire to be measured is calculated according to the described magnetic field intensity and position parameters, wherein the described position parameters are parameters characterizing the relative position of the described current sensor and the described wire to be measured.

Provided is a processor. The processor is used for running a program, wherein the current monitoring method is executed when the program is running.

Specifically, the current monitoring method includes:

step S201, in the case that a magnetic ring is sleeved on a wire to be measured, a current sensor is energized;

step S202, a first voltage signal output by the described current sensor is acquired;

step S203, a resistance value of the magneto-resistive sensor is calculated according to the voltage of the first voltage signal;

step S204, according to the resistance value of the magnetoresistance sensor, a corresponding magnetic field intensity is queried so as to obtain the magnetic field intensity generated at the current sensor by the wire to be measured;

step S205, a current of the described wire to be measured is calculated according to the described magnetic field intensity and position parameters, wherein the described position parameters are parameters characterizing the relative position of the described current sensor and the described wire to be measured.

Provided is a monitoring system. The monitoring system includes a terminal device, a current monitoring device, a processor, a memory and a program stored in the memory and capable of running on the processor. When the processor executes the program, at least the following steps are implemented:

step S201, in the case that a magnetic ring is sleeved on a wire to be measured, a current sensor is energized;

step S202, a first voltage signal output by the described current sensor is acquired;

step S203, a resistance value of the magneto-resistive sensor is calculated according to the voltage of the first voltage signal;

step S204, according to the resistance value of the magnetoresistance sensor, a corresponding magnetic field intensity is queried so as to obtain the magnetic field intensity generated at the current sensor by the wire to be measured;

step S205, a current of the described wire to be measured is calculated according to the described magnetic field intensity and position parameters, wherein the described position parameters are parameters characterizing the relative position of the described current sensor and the described wire to be measured.

The present application further provides a computer program product, which, when being executed on a data processing device, is suitable for executing a program for initializing at least the following method steps:

step S201, in the case that a magnetic ring is sleeved on a wire to be measured, a current sensor is energized;

step S202, a first voltage signal output by the described current sensor is acquired;

step S203, a resistance value of the magneto-resistive sensor is calculated according to the voltage of the first voltage signal;

step S204, according to the resistance value of the magnetoresistance sensor, a corresponding magnetic field intensity is queried so as to obtain the magnetic field intensity generated at the current sensor by the wire to be measured;

step S205, a current of the described wire to be measured is calculated according to the described magnetic field intensity and position parameters, wherein the described position parameters are parameters characterizing the relative position of the described current sensor and the described wire to be measured.

Obviously, those skilled in the art should understand that each module or each step of the present invention can be implemented by a universal computing device, and the modules or steps can be concentrated on a single computing device or distributed on a network formed by a plurality of computing devices, and can be implemented by program codes executable for the computing devices, so that the modules or steps can be stored in a storage device for execution with the computing devices, the shown or described steps can be executed in sequences different from those described here in some cases, or the modules or steps can be made into integrated circuit modules respectively, or multiple modules or steps therein can be made into a single integrated circuit module for implementation. Thus, the present invention is not limited to any specific combination of hardware and software.

Those skilled in the art shall understand that the embodiments of the present application can be provided as a method, a system or a computer program product. Therefore, the present disclosure may take the form of an entirely hardware embodiment, an entirely software embodiment or an embodiment combining software and hardware. Furthermore, the present application may take the form of a computer program product implemented on one or more computer-usable storage media (including but not limited to a disk memory, a CD-ROM, an optical memory, etc.) containing computer-usable program codes.

The present application is described with reference to the flowcharts and/or block diagrams of the method, device (system), and computer program product according to the embodiments of the present application. It should be understood that each flow and/or block in the flowcharts and/or block diagrams and combinations of flows and/or blocks in the flowcharts and/or block diagrams can be implemented by computer program instructions. These computer program instructions may be provided to a general-purpose computer, a dedicated computer, an embedded processor, or a processor of another programmable data processing device to generate a machine, so that an apparatus for implementing functions specified in one or more flows in the flowchart and/or one or more blocks in the block diagram is generated through instructions executed by the computer or the processor of another programmable data processing device.

These computer program instructions may also be stored in a computer-readable memory capable of guiding a computer or other programmable data processing apparatuses to work in a specific manner, so that the instructions stored in the computer-readable memory generate a manufactured product including an instruction apparatus, and the instruction apparatus implements functions specified in one or more flows in the flowchart and/or one or more blocks in the block diagram.

These computer program instructions may also be loaded onto a computer or another programmable data processing device, so that a series of operation steps are executed on the computer or another programmable data processing device to generate processing implemented by the computer, so that the instructions executed on the computer or another programmable data processing device provide steps for implementing functions specified in one or more flows in the flowchart and/or one or more blocks in the block diagram.

In a typical configuration, the computing device includes one or more processors (CPU), an input/output interface, a network interface, and memory.

The memory may include a non-permanent storage in a computer readable medium, a random access memory (RAM), and/or a non-volatile memory, such as a read-only memory (ROM) or a flash RAM. A memory is an example of a computer-readable medium.

Computer-readable media, including both persistent and non-persistent, removable and non-removable media, may implement information storage by any method or technology. The information may be computer readable instructions, data structures, modules of a program, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape disk storage or other magnetic storage devices, or any other non-transmission media, which may be used to store information that may be accessed by a computing device. As defined herein, computer-readable media does not include transitory media, such as modulated data signals and carrier waves.

It should also be noted that the terms "include", "include", or any other variation thereof are intended to cover a non-exclusive inclusion, so that a process, a method, a commodity, or a device that includes a series of elements not only includes those elements, but also includes other elements that are not explicitly listed, or further includes inherent elements of the process, the method, the commodity, or the device. Without further limitation, an element limited by "include a . . . " does not exclude other same elements existing in a process, a method, a commodity, or a device that includes the element.

From the above description, it can be seen that the above embodiments of the present application achieve the following technical effects:

1). In the current monitoring device of the present application, a current sensor senses a magnetic field generated by a current of a wire to be measured, causing a change in a resistance value of a magnetoresistance sensor, that is, according to a change in a first voltage signal output by the current sensor, an induced magnetic field strength can be analyzed, thereby analyzing the current of the wire to be measured, and greatly improving the magnetic induction strength via a magnetic ring, thereby reducing the proportion of a detection error caused by the deviation of a current sensor from a standard magnetic induction position of the wire to be measured, and solving the problem in the prior art that a detection error of a circuit is large due to the deviation of a magnetic induction position of a current sensor.

2). In the current monitoring method of the present application, a current sensor of the current monitoring device senses a magnetic field generated by a current of a wire to be measured to cause a change in a resistance value of a magnetoresistance sensor, so that the intensity of a sensed magnetic field can be analyzed according to a change in a first voltage signal output by the current sensor, thereby analyzing the current of the wire to be measured, and a magnetic induction intensity is greatly improved by means of a magnetic ring, thereby reducing the proportion of a detection error caused by the deviation of a current sensor from a standard magnetic induction position of the wire to be measured, solving the problem in the prior art that a detection error of a circuit is large due to a magnetic induction position deviation of the current sensor, that is, the change in the intensity of the magnetic field can be calculated by means of a first voltage signal, thereby accurately calculating the current of the wire to be measured.

The foregoing descriptions are merely exemplary embodiments of the present application, but are not intended to limit the present application. For those skilled in the art, the present application may have various modifications and variations. Any modifications, equivalent replacements, improvements and the like made within the spirit and principle of the present application shall belong to the scope of protection of the present application.

What is claimed is:

1. A current monitoring device comprising:

a magnetic ring, which is composed of a magnetic medium and has an air gap, wherein the magnetic ring is used for sleeving on a wire to be measured;

a current sensor located in the air gap, a sensitive axis of the current sensor is parallel to a tangent direction corresponding to the center point projected by the current sensor on the magnetic ring, the current sensor comprising a magnetic induction circuit having a magnetoresistance sensor, the magnetic induction circuit being used for outputting a first voltage signal which changes with a resistance value of the magnetoresistance sensor;

a post-processing circuit, which is electrically connected to the current sensor, wherein the post-processing circuit is used for analyzing and obtaining current of the wire to be measured according to the first voltage signal;

the current monitoring device further comprises: a voltage sensor, comprising two probes and a signal processing module, wherein the two probes are respectively arranged in contact with the wire to be measured and a null wire; the signal processing module is electrically connected to the two probes respectively to form a measurement loop; and the post-processing circuit is used for inputting a reference signal into the signal processing module, and obtaining voltage of the wire to be measured through analyzing a second voltage signal detected by the signal processing module.

2. The current monitoring device according to claim 1, characterized in that the magnetoresistance sensor comprises a first magnetoresistance sensor and a second magnetoresistance sensor of a same model, the magnetic induction circuit further comprises a first voltage divider resistor and a second voltage divider resistor of a same resistance value, one end of the first voltage divider resistor is electrically connected to a positive electrode of a power supply, another end of the first voltage divider resistor is electrically connected to one end of the first magnetoresistance sensor, another end of the first magnetoresistance sensor is electrically connected to a negative electrode of the power supply, one end of the second magnetoresistance sensor is electrically connected to the positive electrode of the power supply, another end of the second magnetoresistance sensor is electrically connected to one end of the second voltage divider resistor, another end of the second voltage divider resistor is electrically connected to the negative electrode of the power supply, two output terminals of the magnetic induction circuit are electrically connected to a first common terminal and a second common terminal respectively so as to output the first voltage signal, the first common terminal is a common terminal of the first voltage divider resistor and the first magnetoresistance sensor, and the second common terminalis a common terminal of the second voltage divider resistor and the second magnetoresistance sensor.

3. The current monitoring device according to claim 2, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is parallel to the tangent direction corresponding to the center point projected by the current sensor on the magnetic ring.

4. The current monitoring device according to claim 1, characterized in that the signal processing module comprises a voltage-dividing capacitor and a voltage detection device, the voltage detection device is used for detecting the second voltage signal of the voltage-dividing capacitor, a reference signal is input into one end of the voltage-dividing capacitor, and a voltage signal of a coupling capacitance between the wire to be measured and the two probes is input into another end of the voltage-dividing capacitor.

5. The current monitoring device according to claim 4, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is parallel to the tangent direction corresponding to the center point projected by the current sensor on the magnetic ring.

6. The current monitoring device according to claim 1, characterized in that the post-processing circuit further comprises a security encryption module, wherein the security encryption module is used for generating an authentication ciphertext by using an SM4 algorithm, so as to perform one-way identity authentication on a terminal device acquiring data of the current monitoring device; and the security encryption module is further used for encrypting sent data by using a symmetric encryption algorithm and then sending same to the terminal device which passes the identity authentication, wherein the sent data comprises the current and the voltage of the wire to be measured.

7. The current monitoring device according to claim 6, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is parallel to the tangent direction corresponding to the center point projected by the current sensor on the magnetic ring.

8. The current monitoring device according to claim 1, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is parallel to the tangent direction corresponding to the center point projected by the current sensor on the magnetic ring.

9. The current monitoring device according to claim 1, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is tangent to the magnetic ring.

10. A current monitoring method based on a current monitoring device, the current monitoring device comprising:

a magnetic ring, which is composed of a magnetic medium and has an air gap, wherein the magnetic ring is used for sleeving on a wire to be measured;

a current sensor located in the air gap, a sensitive axis of the current sensor is parallel to a tangent direction corresponding to the center point projected by the current sensor on the magnetic ring, the current sensor comprising a magnetic induction circuit having a magnetoresistance sensor, the magnetic induction circuit being used for outputting a first voltage signal which changes with a resistance value of the magnetoresistance sensor;

a post-processing circuit, which is electrically connected to the current sensor, wherein the post-processing circuit is used for analyzing and obtaining current of the wire to be measured according to the first voltage signal; the current monitoring method comprising:

powering on a current sensor in a case that a magnetic ring is sleeved on a wire to be measured;

acquiring a first voltage signal output by the current sensor;

calculating a resistance value of a magnetoresistance sensor according to a voltage of the first voltage signal;

querying corresponding magnetic field strength according to the resistance value of the magnetoresistance sensor, so as to obtain magnetic field strength generated at the current sensor by the wire to be measured;

calculating and obtaining current of the wire to be measured according to the magnetic field strength and a position parameter, wherein the position parameter is a parameter characterizing the relative position between the current sensor and the wire to be measured;

the current monitoring device further comprises: a voltage sensor, comprising two probes and a signal processing module, wherein the two probes are respectively arranged in contact with the wire to be measured and a null wire; the signal processing module is electrically connected to the two probes respectively to form a measurement loop; and the post-processing circuit is used for inputting a reference signal into the signal processing module, and obtaining voltage of the wire to be measured through analyzing a second voltage signal detected by the signal processing module.

11. The current monitoring method according to claim 10, characterized in that the signal processing module comprises a voltage-dividing capacitor, a voltage detection device and a reference signal, the voltage detection device is used for detecting the second voltage signal of the voltage-dividing capacitor, the reference signal is input into one end of the voltage-dividing capacitor, and a voltage signal of a coupling capacitance between the wire to be measured and the probe is input into another end of the voltage-dividing capacitor, and the method further comprises: acquiring two second voltage signals detected at two ends of the voltage-dividing capacitor; calculating a ratio of the second voltage signal generated by the coupling capacitance input to the second voltage signal generated by the reference signal input, so as to obtain a voltage ratio, wherein the voltage ratio is the ratio of a voltage of the wire to be measured to the voltage of the reference signal; and calculating to obtain the voltage of the wire to be measured according to the voltage of the reference signal and the voltage ratio.

12. The current monitoring method according to claim 11, characterized in that the method further comprises:

generating a random number;

encrypting the random number by using a preset authentication key to obtain an authentication ciphertext;

sending the authentication ciphertext and a security chip ID to a terminal device, and receiving a decryption result of the terminal device, wherein the security chip ID is an ID of the current monitoring device;

and in a case that the decryption result is consistent with the random number, passing authentication of the terminal device.

13. The current monitoring method according to claim 12, characterized in that after passing authentication of the terminal device, the method further comprises:

encrypting sent data by using the random number, so as to obtain an encrypted ciphertext, wherein the sent data comprises the current and the voltage of the wire to be measured;

sending a serial number and MAC of the current monitoring device and the encrypted ciphertext to the terminal device, so that the terminal device decrypts the sent data.

14. The current monitoring method according to claim 10, characterized in that the magnetoresistance sensor comprises a first magnetoresistance sensor and a second magnetoresistance sensor of a same model, the magnetic induction circuit further comprises a first voltage divider resistor and a second voltage divider resistor of a same resistance value, one end of the first voltage divider resistor is electrically connected to an positive electrode of a power supply, another end of the first voltage divider resistor is electrically connected to one end of the first magnetoresistance sensor, another end of the first magnetoresistance sensor is electrically connected to a negative electrode of the power supply, one end of the second magnetoresistance sensor is electrically connected to the positive electrode of the power supply, another end of the second magnetoresistance sensor is electrically connected to one end of the second voltage divider resistor, another end of the second voltage divider resistor is electrically connected to the negative electrode of the power supply, two output terminals of the magnetic induction circuit are electrically connected to a first common terminal and a second common terminal respectively so as to output the first voltage signal, the first common terminal is a common terminal of the first voltage divider resistor and the first magnetoresistance sensor, and the second common terminal is a common terminal of the second voltage divider resistor and the second magnetoresistance sensor.

15. The current monitoring method according to claim 10, characterized in that the signal processing module comprises a voltage-dividing capacitor, a voltage detection device and a reference signal, the voltage detection device is used for detecting the second voltage signal of the voltage-dividing capacitor, the reference signal is input into one end of the voltage-dividing capacitor, and a voltage signal of a coupling capacitance between the wire to be measured and the two probes is input into another end of the voltage-dividing capacitor.

16. The current monitoring method according to claim 10, characterized in that the post-processing circuit further comprises a security encryption module, wherein the security encryption module is used for generating an authentication ciphertext by using an SM4 algorithm, so as to perform one-way identity authentication on a terminal device acquiring data of the current monitoring device; and the security encryption module is further used for encrypting sent data by using a symmetric encryption algorithm and then sending same to the terminal device which passes the identity authentication, wherein the sent data comprises the current and the voltage of the wire to be measured.

17. The current monitoring method according to claim 10, characterized in that the current monitoring device comprises a first fixing piece and a second fixing piece, wherein the first fixing piece is used for fixing the magnetic ring on the wire to be measured, so that the wire to be measured is located on the axis of the magnetic ring, and the second fixing piece is used for fixing the current sensor in the air gap, so that the sensitive axis of the current sensor is parallel to the tangent direction corresponding to the center point projected by the current sensor on the magnetic ring.

* * * * *